(12) United States Patent
Smus et al.

(10) Patent No.: US 9,811,311 B2
(45) Date of Patent: Nov. 7, 2017

(54) USING ULTRASOUND TO IMPROVE IMU-BASED GESTURE DETECTION

(71) Applicant: Google Inc., Mountain View, CA (US)

(72) Inventors: Boris Smus, San Francisco, CA (US); Christian Plagemann, Palo Alto, CA (US); Ankit Mohan, San Mateo, CA (US); Ryan Michael Rifkin, Oakland, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/230,038

(22) Filed: Mar. 31, 2014

(65) Prior Publication Data

US 2015/0261495 A1    Sep. 17, 2015

Related U.S. Application Data

(60) Provisional application No. 61/954,275, filed on Mar. 17, 2014.

(51) Int. Cl.
*G06F 3/16* (2006.01)
*G06F 3/01* (2006.01)
(Continued)

(52) U.S. Cl.
CPC ............. *G06F 3/167* (2013.01); *G01S 1/763* (2013.01); *G01S 11/14* (2013.01); *G06F 3/017* (2013.01)

(58) Field of Classification Search
CPC .................................. G06F 3/137; G06F 3/017
See application file for complete search history.

(56) References Cited

U.S. PATENT DOCUMENTS

| 8,421,752 B2 | 4/2013 | DeLuca |
| 2006/0146765 A1* | 7/2006 | Van De Sluis et al. ...... 370/338 |

(Continued)

FOREIGN PATENT DOCUMENTS

| EP | 2575332 | 4/2013 |
| JP | 2011135551 | 7/2011 |
| WO | 2012/153227 | 11/2012 |

OTHER PUBLICATIONS

Anonymous: "Online Certificate Status Protocol," Wikipedia, Dec. 18, 2013, Retrieved from the Internet: URL:http://fr.wikipedia.org/wiki/Online_Certificate_Status_Protocol, [retrieved on May 13, 2015], 7 pages (with English translation).

(Continued)

*Primary Examiner* — Christopher E Leiby
(74) *Attorney, Agent, or Firm* — Fish & Richardson P.C.

(57) ABSTRACT

The present disclosure provides techniques for improving IMU-based gesture detection by a device using ultrasonic Doppler. A method may include detecting the onset of a gesture at a first device based on motion data obtained from an IMU of the first device. An indication of the detection of the onset of the gesture may be provided to a second device. Next, a first audio signal may be received from the second device. As a result, the gesture may be identified based on the motion data and the received first audio signal. In some cases, a first token encoded within the first audio signal may be decoded and the first token may be provided to a third coordinating device. A confirmation message may be received from the third coordinating device based on the first token provided and identifying the gesture may be further based on the confirmation message.

22 Claims, 4 Drawing Sheets

(51) Int. Cl.
*G01S 1/76* (2006.01)
*G01S 11/14* (2006.01)

(56) References Cited

U.S. PATENT DOCUMENTS

| | | |
|---|---|---|
| 2007/0115137 A1 | 5/2007 | Lyon et al. |
| 2009/0265470 A1 | 10/2009 | Shen et al. |
| 2010/0271302 A1 | 10/2010 | Pering et al. |
| 2011/0081923 A1 | 4/2011 | Forutanpour et al. |
| 2012/0016641 A1 | 1/2012 | Raffa et al. |
| 2013/0009875 A1 | 1/2013 | Fry et al. |
| 2013/0016122 A1* | 1/2013 | Bhatt ............... G06F 3/04845 345/620 |
| 2013/0147770 A1 | 6/2013 | Dahl et al. |
| 2013/0154919 A1 | 6/2013 | Tan et al. |
| 2013/0173474 A1* | 7/2013 | Ranganathan et al. ......... 705/67 |
| 2013/0219278 A1 | 8/2013 | Rosenberg |
| 2013/0222295 A1 | 8/2013 | Lim et al. |
| 2013/0229508 A1* | 9/2013 | Li et al. ..................... 348/77 |
| 2013/0300644 A1* | 11/2013 | Chen ................... G06F 3/017 345/156 |
| 2014/0118257 A1* | 5/2014 | Baldwin ............... G06F 3/017 345/158 |
| 2014/0188989 A1 | 7/2014 | Stekkelpak et al. |
| 2015/0011247 A1* | 1/2015 | Ezra ................... G06F 3/0227 455/456.3 |
| 2015/0092520 A1* | 4/2015 | Robison ................ G04G 21/02 368/9 |

OTHER PUBLICATIONS

International Search Report and Written Opinion in International Application No. PCT/US2015/020699, dated Jun. 5, 2015, 17 pages.

Aumi, Md Tanvir Islam, "Doplink: using the doppler effect for multi-device interaction", UbiComp'13, Sep. 8-12, 2013, Zurich, Switzerland, Sep. 12, 2013.

Sun, Zheng et al., "Spartacus: spatially-aware interaction for mobile devices through energy-efficient audio sensing", MobiSys'13, Jun. 25-28, 2013, Taipei, Taiwan, Jun. 28, 2013.

International Preliminary Report on Patentability in International Application No. PCT/US2015,020699, dated Sep. 9, 2016, 13 pages.

* cited by examiner

USING ULTRASOUND TO IMPROVE IMU-BASED GESTURE DETECTION

PRIORITY

This application claims the benefit of U.S. Provisional Application No. 61/954,275, filed Mar. 17, 2014.

BACKGROUND

Gesture detection can be implemented using a combination of IMU sensors, such as accelerometers and gyroscopes, with other sensors on a device. In some cases, a gesture may be performed in order to transfer content from one device to another. In this case, for example, a user of a device may wish to transfer an object on the screen of the device to another device nearby by performing a gesture on the device. However, on-device sensors, such as IMU sensors, are not particularly reliable and can often trigger falsely. These false detections can negatively impact the user's experience. In addition, these types of gestures may require some means of verifying the direction of the device relative to another device (e.g., another device to which the user wishes to transfer content) and to identify the other device toward which a gesture is being aimed. This type of gesture can be difficult to detect using an on-device sensor, and in some cases, without the use of a camera.

BRIEF SUMMARY

According to an embodiment of the disclosed subject matter a method may include detecting the onset of a gesture at a first device based on motion data obtained from an IMU of the first device. Detection of the onset of the gesture may be indicated to a second device. Next, a first audio signal may be received from the second device. As a result, the gesture may be identified based on the motion data and the received first audio signal.

An implementation of the disclosed subject matter provides a system including a processor configured to detect the onset of a gesture at a first device based on motion data obtained from an IMU of the first device. Detection of the onset of the gesture may be indicated to a second device. Next, a first audio signal may be received from the second device. Accordingly, the gesture may be identified based on the motion data and the received first audio signal.

In an implementation, a system according to the disclosed subject matter includes means for detecting the onset of a gesture at a first device based on motion data obtained from an IMU of the first device and means for indicating, to a second device, the detection of the onset of the gesture. The system further includes means for receiving a first audio signal from the second device and means for identifying the gesture based on the motion data and the received first audio signal.

Implementations of the disclosed subject matter provide techniques for improving identification of a gesture on a device by combining IMU-based data with ultrasonic Doppler. By combining data obtained from an IMU of a device with audio signal data from another device, identification of a gesture may be more reliable and the direction of a gesture may be verified. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
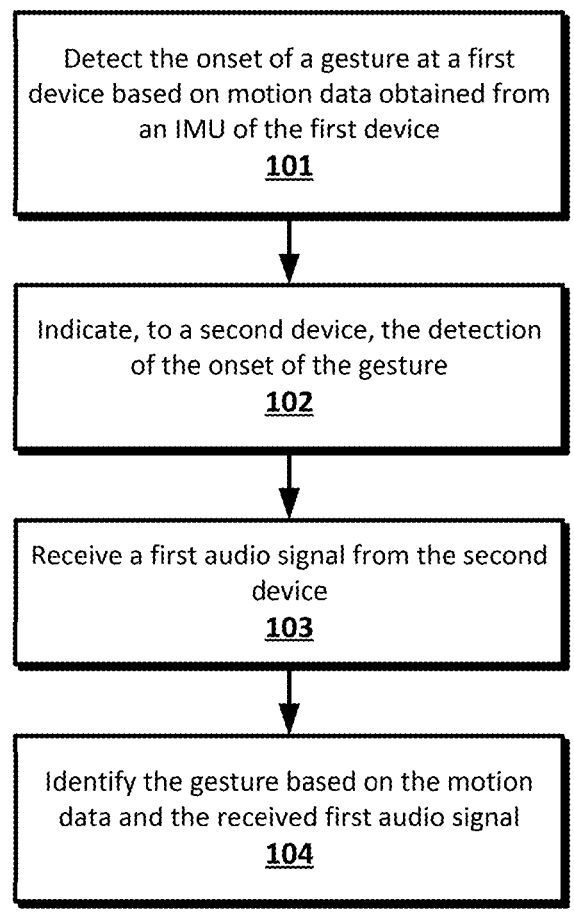
FIG. 1 shows an example process according to an implementation of the disclosed subject matter.

Detection of a gesture and determination of the direction of movement of a device can be difficult to determine with high accuracy. In general, on-device IMU sensors such as gyroscopes and accelerometers are used to obtain motion data on a device and detect a gesture performed by a user of the device. An accelerometer is typically noisy and gesture detection on a device generally relies on sensor fusion of movement data from an accelerometer with data from a gyroscope. Sensor fusion typically refers to the user of multiple sensors on a device to compensate for weaknesses of each sensor type. Given this approach, only acceleration of the device can be detected. If this detected acceleration of a device is integrated twice, the noise is further amplified, making the position estimation of the device almost useless. In particular, this position signal can be prone to drift, and does not provide any information about the device being moved in relation to salient objects (e.g., another device) nearby.

Other approaches to gesture detection include correlating an IMU data stream with vision-based approaches involving a camera. However, cameras require a significant amount of power and vision-based techniques typically involve computationally intensive processing in order to extract meaning from a video signal.

The present disclosure provides techniques for improving identification of an IMU-based gesture on a device by using ultrasound, and in some cases, ultrasonic Doppler. The Doppler Effect (or Doppler shift) is the change in frequency of a wave (or other periodic event) for an observer, e.g., a receiver device, moving relative to its source, such as a sender device. As an example, a gesture may be detected based on data from two device, a sender device and a receiver device. In some cases, the receiver device and the sender device may negotiate which audio signal frequency (i.e., an expected audio signal) each device will be using, e.g., a frequency may be high enough such that most humans cannot hear it. In general, the frequency response of most speakers and microphones may be limited, and these speakers and microphones may be incapable of producing tones above 20 KHz. The sender device may emit an audio signal comprising a sinusoid at frequency (F). The receiver device may continuously run a Fourier transform (e.g., FFT) on the audio signal input, received from the sender device, listening for frequency peaks near the expected audio signal (F). The receiver device may track differences in the received audio signal (F) from the expected audio signal frequency. As the sending device and the receiver device move relative to one another, the receiver device may store the peak offset (Pi) in a circular buffer. The receiver device may use this peak offset (Pi) in combination with motion data streams available from an accelerometer and gyroscope on the receiver device. As a result, the receiver device may use the received audio signal data (e.g., peak offset (Pi)) and the motion data to identify a gesture. In this example, alternatively, rather than the audio signal comprising a sinusoid at a single frequency (F), a spread spectrum sequence may be used.

This sequence of peak offsets (Pi) corresponds to the relative velocity of the two devices. In some cases, the sender device may be stationary and the receiver device may be moving. For example, a sender device may be a laptop and a receiver device may be a smartphone held in the hand of a user. In addition to the motion data stream from the IMU sensor on the smartphone, the sender device may also obtain audio signal data including the sequence of peak offsets (Pi), which correspond to the velocity of the receiver device R in relation to the sender device. The IMU may provide motion data such as the acceleration (y") of the receiver device, and the audio signal data such as the peak offsets may provide the relative velocity (y') of the receiver device. With these two data streams received from two unrelated sources, an improved signal can be obtained. As a result of integration, position (y) of the receiver device relative to the sender device may be determined more easily and the determined position (y) is more reliable than relying on known techniques of double-integrating acceleration (y").

In an implementation, the motion data stream may be obtained on the sending device, for example, the laptop in the example above. In this case, either the sender device and/or the receiver device may provide audio signal data to the other device, in which case one or both of the devices may detect the gesture. In some cases, the sender device may be part of a room-level infrastructure designed to make tracking of an audio signal easier. For example, the techniques described herein may be implemented in a surround-sound audio system and designed to make gesture detection more reliable in a particular room with multiple sources of audio signals that may be received by a receiving device.

In addition to providing an additional stream (i.e., an audio signal) to fuse with motion data received from an accelerometer and gyroscope, the frequency shift peaks (Pi) of the received audio signal may also provide a velocity of the receiving device relative to the source of the audio signal, i.e., the sending device. In some cases this velocity of the receiving device may not be important such as in an implementation in an instrumented room with multiple sources of audio signals in the example above. In other cases, determining the direction of movement of a device can be critical. For example, in some cases, identification of a gesture may require the gesture to be aimed toward a target device. In this case, an IMU alone does not provide any information as to the direction of movement of a device relative to another device. On the other hand, Doppler shift based on a received audio signal is drastically affected depending on the direction of the gesture performed on a device.

Variations may be implemented in the example described above. For example, rather than using two devices, i.e., a sender device and a receiver device, multiple devices may be used. As an example, there may be multiple sender and/or receiver devices, each device emitting and/or listening on different corresponding frequencies (e.g., $F_1, F_2 \ldots F_n$). Another variation may be to use multiple speakers per device. For example, rather than using only one speaker per device, many devices may have stereo speakers, or a surround sound system including multiple speakers may be used. In these cases, the sender device may emit multiple audio signals each at a different frequency and each associated with one of multiple channels. Another implementation may include bidirectional communication between the sender device and the receiver device. For example, rather than one way communication from the sender device to the receiver device, each device may act as both a sender and receiver.

In general, implementations of the disclosed subject matter provide techniques for improving identification of a gesture on a device by combining IMU-based data with an audio signal and ultrasound. Although the examples described herein combine IMU-based data with an audio signal and ultrasonic Doppler, other audio features may be used to improve gesture detection according to the techniques described herein. As a specific example, in cases in which multiple speakers are present in an environment and/or are being used to detect a gesture, the relative amplitude of the speakers as a signal may be used to improve the accuracy of detection of the gesture. Alternatively, or in addition to the Doppler Effect, a time-of-flight technique may be used to determine the relative position of a first device to a second device. Other audio features not described herein may be used in implementing an audio-based gesture detector as disclosed herein. FIG. 1 shows an example process according to an implementation of the disclosed subject matter. As shown, a method may include detecting the onset of a gesture at a first device based on motion data obtained from an IMU of the first device, at 101. In general, an inertial measurement unit works by detecting the current rate of acceleration using one or more accelerometers, and detects changes in rotational attributes like pitch, roll and yaw using one or more gyroscopes. And some also include a magnetometer, mostly to assist with calibration against orientation drift. The detection of the onset of the gesture may be indicated to a second device, at 102. Next, a first audio signal may be received from the second device, at 103. In general, an audio signal is a representation of sound and typically has a frequency in the audio frequency range of approximately 20 to 20,000 Hz (i.e., the limits of human hearing). For example, an audio signal may have a single frequency, multiple frequencies such as a spread spectrum sequence, and/or in situations which include multiple sender devices, one or more receivers may listen for different corresponding frequencies. An audio signal may be emitted and/or received by the first device and/or second device. A device as used herein may be a tablet, a wearable computer, a smartphone, a laptop, a mobile device, a set-top box, a PC, a TV, an audio system, and another other device which may be used to detect a gesture. A device may include one or more sensors such as an ambient light sensor, an accelerometer, a gyroscope, a camera, a magnetometer, a speaker, a microphone, a touch screen, and the like. Based on the motion data and the received first audio signal, a gesture may be identified at 104, for example by the first device.

Figure 2:
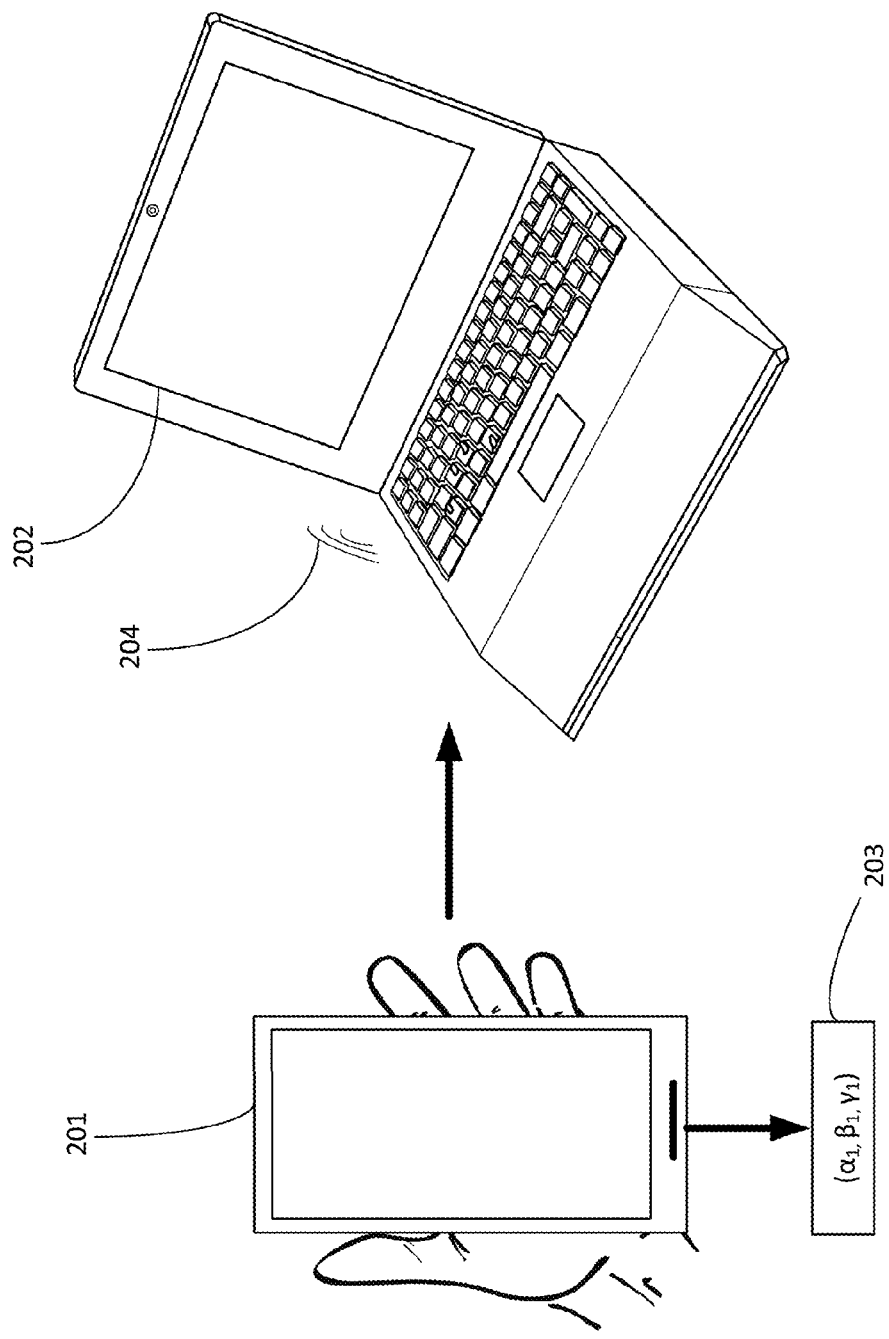
FIG. 2 shows an example system arrangement according to an implementation of the disclosed subject matter.

FIG. 2 shows an example system arrangement according to an implementation of the disclosed subject matter. As shown, a user may be using a device 201, such as a smartphone. The user may wish to transfer a document, currently being displayed on smartphone 201, to a device 202, such as a laptop, using a gesture performed on the device 201. A gesture may be any interaction by a user with a device, such as moving, waving, shaking, tapping, touching, and the like, of a device. The user may perform a gesture motion by moving the smartphone 201 toward laptop 202. Smartphone 201 may detect the onset of the gesture based on motion data 203 obtained from an IMU of the smartphone 201. For example, motion data 203 may include an angle associated with the yaw (e.g., $\alpha_1$) of the smartphone 201, an angle associated with the pitch (e.g., $\beta_1$) of the smartphone 201, an angle associated with the roll (e.g., $\gamma_1$) of the smartphone, and/or an acceleration of the smartphone. The smartphone 201 may indicate, to the laptop 202, the detection of the onset of the gesture. As a result, the indication of the detection of the onset of the gesture from smartphone 201 may trigger the laptop 202 to emit an audio signal 204. The smartphone 201 may receive the audio signal 204 from the laptop 202. Based on the motion data 203 and the received audio signal 204, the smartphone 201 may identify the gesture. For example, smartphone 201 may identify the gesture as intending for a document to be transferred to the laptop 202. As a result of identifying the gesture, an action may be performed based on the gesture identified. As in the example above, the document may be transferred to the laptop 202.

In some cases, identification of a gesture by a device may be based on data and/or information in addition to a received audio signal and motion data. As in the example above, a gesture by a user of a smartphone intending to transfer a document to a laptop may implicate security issues if the gesture is falsely identified. For example, if a gesture is falsely identified, a document may be transferred to a device when the user may not have intended to cause such a transfer. Accordingly, additional data and/or information may be used to identify a gesture by a device to avoid falsely triggering an action based on a falsely identified gesture. In some cases, in order to confirm the occurrence of a gesture and/or a user's intention, one or more additional steps may be taken by the system. For example, steps may be taken to verify, authorize, secure, and/or authenticate communication by or between the devices used for identifying a gesture, and in some cases, a handshake procedure may be used. As an example, referring back to FIG. 2, according to an implementation, a first token may be encoded within the audio signal 204. The smartphone 201 may decode the first token and provide the first token to a third coordinating device. Subsequently, a confirmation message may be received from the third coordinating device based on the first token provided. In this case, identification of the gesture by the smartphone 201 may be further based on the confirmation message received from the third coordinating device. For example, if the smartphone receives a message from the third coordinating device indicating that the token has not been confirmed or does not receive a confirmation message from the third coordinating device at all, the smartphone may not identify the gesture.

In some cases, an indication of an expected audio signal may be received from a third coordinating device or the second device. For example, as shown in FIG. 2, the laptop 202 (or a third coordinating device, not shown) may provide, to the smartphone 201, an indication of an expected audio signal X. For example, an expected audio signal X may have a specific frequency. As a result, the smartphone 201 may listen for the expected audio signal X. Based on a comparison of the expected audio signal X and the received audio signal 204, the smartphone 201 may or may not identify the gesture. In this case, the comparison of the expected audio signal X and the received audio signal 204 may be used to identify the gesture in addition to the motion data and the received audio signal 204.

In an implementation, a second audio signal may be emitted by the first device. In this case, both a first device and a second device may each act as a sender and a receiver of audio signals. Referring back to FIG. 2, a user of the smartphone 201 may wish to transfer content to the laptop 202. While holding the smartphone 201, the user may begin a motion for a gesture associated with the action of transferring content to a device. For example, the user may begin the gesture by moving the smartphone 201 towards the laptop 202. In some cases, each of the smartphone 201 and the laptop 202 may have a token which is unique to each device. As the smartphone 201 moves towards the laptop 202, the smartphone 201 may detect the onset of the gesture based on motion data obtained from an IMU (e.g., an accelerometer and/or gyroscope) on the smartphone 201. As a result, the smartphone 201 may begin emitting an audio signal, which may include the token of the smartphone 201. A microphone (or a speaker, or the like) on the laptop 202 may be listening, and as soon as the laptop 202 receives the audio signal from the smartphone 201, the laptop 202 may begin emitting an audio signal, which may include the token of the laptop 202. As a result, one or more additional sensors may be triggered on the smartphone 201. For example, a microphone may be turned on in addition to the accelerometer and the gyroscope on the smartphone 201. The microphone on the smartphone 201 may detect the Doppler shift based on the audio signal being received from the laptop 202 and the audio signal which is being emitted by the smartphone 201. Detection of Doppler shift between the first and second devices may also be used to determine the direction of movement of the first device relative to the second device. As a result, identification of the gesture may be further based on the determined direction of movement of the first device relative to the second device.

By the end of the gesture, both the smartphone 201 and the laptop 202 may have received the token associated with the other device. For example, the smartphone 201 may decode the token, associated with the laptop 202, included within the audio signal 204 received from the laptop 202. Similarly, the laptop 202 may decode the token associated with the smartphone 201, included within the audio signal emitted by the smartphone 201 and received by the laptop 202. According to an implementation, the first device may receive a confirmation message from the second audio device based on a second token encoded in the second audio signal, and identification of the gesture may be further based on the confirmation message received from the second audio device. For example, the smartphone 201 may receive a confirmation message from the laptop 202 based on the token associated with smartphone 201 encoded in the audio signal emitted by the smartphone 201. The confirmation message may confirm that the smartphone 201 and laptop 202 are within proximity of one another and/or that a gesture is intended between the two devices. In some cases, the smartphone 201 may provide an indication of the identified gesture to a third coordinating device. In general, a third coordinating device may be a cloud-based device.

According to an implementation, each of the smartphone 201 and the laptop 202 may provide a third coordinating device with the token associated with the device itself and/or the token associated with another device encoded within the audio signal received from the other device. For example, the smartphone 201 may provide its token and the token associated with the laptop 202 to the third coordinating device. Similarly, the laptop 202 may provide its token and the token associated with the smartphone 201 to the third coordinating device. The third coordinating device may match the token information received from both devices. In particular, the third coordinating device may confirm that the pair of tokens received from each device are the same. Additionally, the third coordinating device may also use location information associated with each device to determine that the devices are co-located. If the third coordinating device confirms the token information for the devices, the third coordinating device may provide a confirmation message to one or both of the smartphone 201 and laptop 202. In this case, for example, identifying the gesture by the smartphone 201 may be further based on the confirmation message received from the third coordinating device. Following identification of the gesture, an action may be performed. An action may be performed by the first device, the second device, the third coordinating device, and/or any other device that may have received an indication of the identified gesture. As an example, based on the identified gesture, e.g., that the user intends to transfer content from the smartphone to the laptop, the content may be transferred to the laptop 202. For example, the content may be transferred to the laptop 202 from either the smartphone 201, the third coordinating device, or from a remote server.

Figure 3:
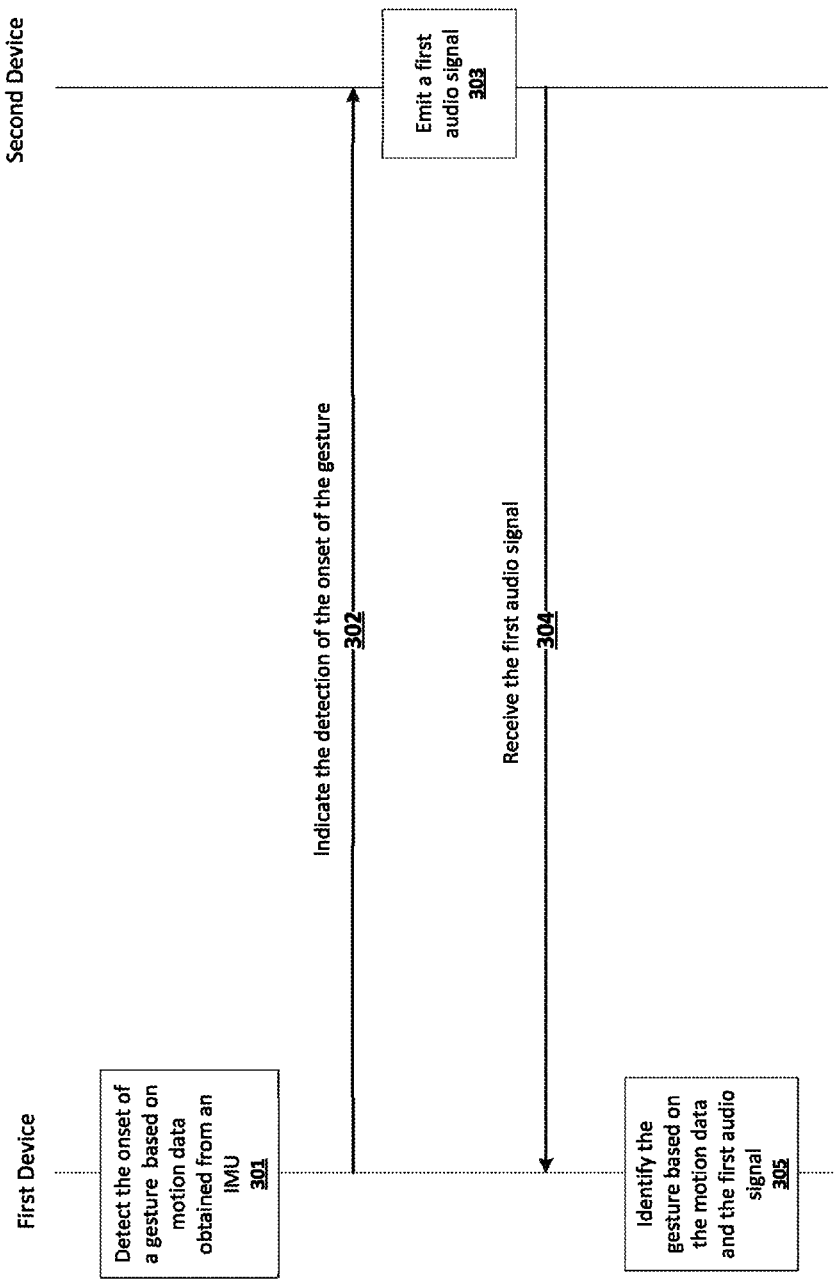
FIG. 3 shows an example information flow according to an implementation of the disclosed subject matter.

FIG. 3 shows an example information flow according to an implementation of the disclosed subject matter. As shown, a first device may detect the onset of a gesture based on motion data obtained from an IMU of the first device, at 301. The first device may indicate, to a second device, the detection of the onset of the gesture, at 302. The second device may emit a first audio signal, at 303. The first device may receive the first audio signal from the second device, at 304. Based on the motion data and the first audio signal received from the second device, the first device may identify the gesture, at 305. As described above, communication between the first device and the second device may be facilitated by a third coordinating device. For example, although not shown in FIG. 3, the third coordinating device may indicate, to the second device, the detection of the onset of the gesture at the first device. As another example, the first device may provide an indication of the identified gesture to the third coordinating device, and the third coordinating device may perform an action and/or provide an instruction to another device based on the gesture identified. In some cases, multiple coordinating devices may be used, for example, in an implementation in which multiple devices are used to identify a gesture.

Figure 4:
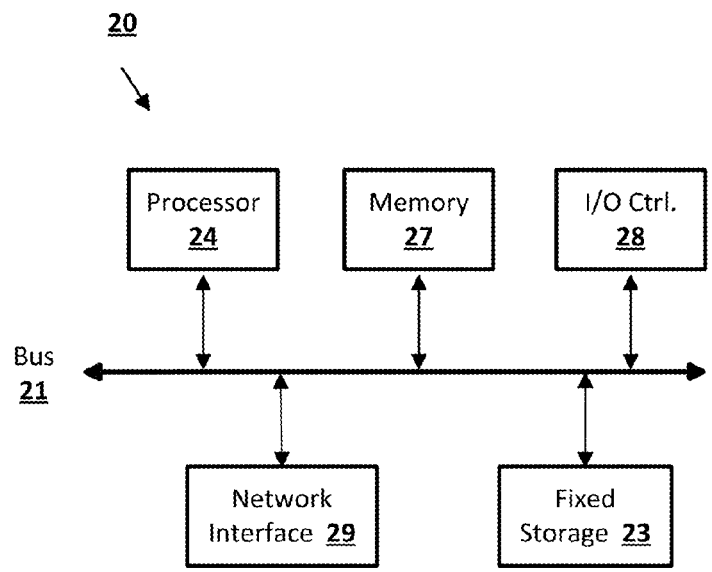
FIG. 4 shows a computer according to an embodiment of the disclosed subject matter.

Embodiments of the presently disclosed subject matter may be implemented in and used with a variety of component and network architectures. FIG. 4 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 5.

Many other devices or components (not shown) may be connected in a similar manner, such as document scanners, digital cameras, auxiliary, supplemental, or backup systems, or the like. Conversely, all of the components shown in FIG. 4 need not be present to practice the present disclosure. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 5:
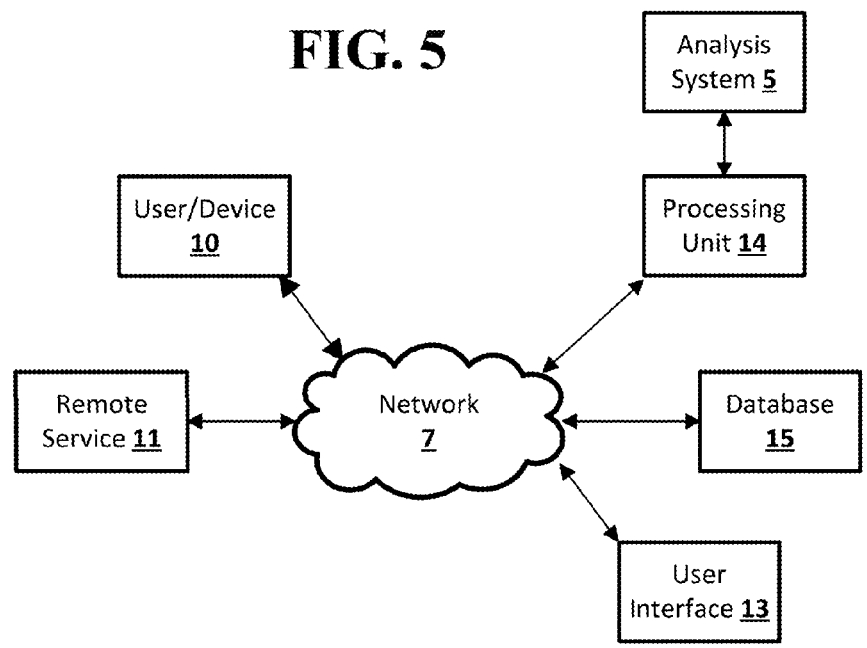
FIG. 5 shows a network configuration according to an embodiment of the disclosed subject matter.

FIG. 5 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as CD-ROMs, DVDs, hard drives, USB (universal serial bus) drives, flash drives, or any other non-transitory machine readable storage medium, such that when the computer program code is loaded into and executed by a computer, the computer becomes an apparatus for practicing embodiments of the disclosed subject matter. Embodiments also may be embodied in the form of computer program code, for example, whether stored in a non-transitory storage medium, loaded into and/or executed by a computer. When the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information, as previously described. The memory or other storage medium may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method comprising:
   determining, based on accelerometer or gyroscope data generated by one or more sensors on a first computing device, that a user of the first computing device is likely to have begun performing a movement using the first computing device;
   after determining that the user of the first computing device is likely to have begun performing the movement using the first computing device and before the first computing device has identified a particular gesture corresponding to the movement, transmitting, from the first computing device to a different, physically separate, second computing device, data indicating that the user of the first computing device is likely to have begun performing the movement using the first computing device;
   before the first computing device has identified the particular gesture corresponding to the movement, obtaining, by the first computing device, audio data corresponding to a sound generated by the second computing device in response to the first computing device transmitting data to the different, physically separate, second computing device indicating that the user of the first computing device was likely to have begun performing the movement using the first computing device;
   before the first computing device has identified the particular gesture corresponding to the movement, identifying one or more frequency shift peak values from the audio data; and
   identifying, by the first computing device, the particular gesture corresponding to the movement based at least on (i) the accelerometer or gyroscope data that was used to determine that the user of the first computing device was likely to have begun performing the movement using the first computing device, and (ii) the one or more of the frequency shift peak values that are identified from the audio data that (I) corresponds to the sound generated by the second computing device and (II) was obtained in response to the first computing device transmitting data to the different, physically separate, second computing device indicating that the user of the first computing device was likely to have begun performing the movement using the first computing device.

2. The computer-implemented method of claim 1, further comprising:
   executing a function corresponding to the particular gesture; and
   determining a direction associated with the particular gesture.

3. The computer-implemented method of claim 1, wherein the sound generated by the second computing device is not audible to the user.

4. The computer-implemented method of claim 1, wherein identifying, by the first computing device, the particular gesture corresponding to the movement based at least on (i) the accelerometer or gyroscope data that was used to determine that the user of the first computing device was likely to have begun performing the movement using the first computing device, and (ii) the one or more of the frequency shift peak values that are identified from the audio data that (I) corresponds to the sound generated by the second computing device and (II) was obtained in response to the first computing device transmitting data to the different, physically separate, second computing device indicating that the user of the first computing device was likely to have begun performing the movement using the first computing device comprises:
   receiving an indication of an expected audio signal, the expected audio signal having a particular frequency and one or more particular frequency peaks;

comparing the obtained audio data with the indication of the expected audio signal to determine one or more peak offsets; and identifying the particular gesture corresponding to the movement based on the comparison of the obtained audio data with the indication of the expected audio signal and the determined one or more peak offsets.

5. The computer-implemented method of claim 1, wherein obtaining, by the first computing device, audio data corresponding to the sound generated by the second computing device in response to the first computing device transmitting data to the different, physically separate, second computing device indicating that the user of the first computing device was likely to have begun performing the movement using the first computing device comprises receiving the audio data from a third computing device; and wherein the audio data corresponding to the sound generated by the second computing device includes a token.

6. The computer-implemented method of claim 1, wherein identifying the one or more frequency shift peak values from the audio data comprises determining a velocity of the first computing device relative to the second computing device.

7. The computer-implemented method of claim 1, wherein:

the accelerometer or gyroscope data includes an angle associated with a yaw of the first computing device, an angle associated with a pitch of the first computing device, and an angle associated with a roll of the first computing device; and transmitting, from the first computing device to the different, physically separate, second computing device, the data indicating that the user of the first computing device is likely to have begun performing the movement using the first computing device comprises:

transmitting, to the second computing device, data indicating a change in one or more of the yaw, the pitch, and the roll of the first computing device.

8. The computer-implemented method of claim 1, wherein the accelerometer or gyroscope data includes an angle associated with a yaw of the first computing device, an angle associated with a pitch of the first computing device, and an angle associated with a roll of the first computing device, and does not include the sound data or data derived from sound data;

wherein transmitting, from the first computing device to the different, physically separate, second computing device, the data indicating that the user of the first computing device is likely to have begun performing the movement using the first computing device comprises transmitting, to the second computing device, data indicating a change in one or more of the yaw, the pitch, and the roll of the first computing device; and wherein identifying, by the first computing device, a particular gesture corresponding to the movement based at least on (i) the accelerometer or gyroscope data that was used to determine that the user of the first computing device was likely to have begun performing the movement using the first computing device, and (ii) the one or more of the frequency shift peak values that are identified from the audio data that (I) corresponds to the sound generated by the second computing device and (II) was obtained in response to the first computing device transmitting data to the different, physically separate, second computing device indicating that the user of the first computing device was likely to have begun performing the movement using the first computing device comprises:

combining (i) the accelerometer or gyroscope data and (ii) the one or more of the frequency shift peak values;

generating data indicative of the particular gesture corresponding to the movement based on a combination of (i) the accelerometer or gyroscope data and (ii) the one or more of the frequency shift peak values that are identified from the audio data that corresponds to the sound generated by the second computing device; and determining the particular gesture corresponding to the movement based on the data indicative of the particular gesture.

9. The computer-implemented method of claim 8, wherein combining (i) the accelerometer or gyroscope data and (ii) the one or more of the frequency shift peak values comprises:

combining data indicative of an acceleration of the first computing device obtained from the accelerometer or gyroscope data with data indicative of a velocity of the first computing device obtained from the one or more frequency shift peak values.

10. A non-transitory computer-readable storage medium encoded with a computer program, the program comprising instructions that upon execution by a computer cause the computer to perform operations comprising:

determining, based on accelerometer or gyroscope data generated by one or more sensors on a first computing device, that a user of the first computing device is likely to have begun performing movement using the first computing device;

after determining that the user of the first computing device is likely to have begun performing movement using the first computing device and before the first computing device has identified a particular gesture corresponding to the gesture, transmitting, to a different, physically separate, second computing device, data indicating that the user of the first computing device is likely to have begun performing the movement using the first computing device;

before the first computing device has identified the particular gesture corresponding to the movement, obtaining, by the first computing device, audio data corresponding to a sound generated by the second computing device in response to the first computing device transmitting data to the different, physically separate, second computing device indicating that the user of the first computing device was likely to have begun performing the movement using the first computing device;

before the first computing device has identified the particular gesture corresponding to the movement, identifying one or more frequency shift peak values from the audio data; and identifying, by the first computing device, the particular gesture corresponding to the movement based at least on (i) the accelerometer or gyroscope data that was used to determine that the user of the first computing device was likely to have begun performing the movement using the first computing device, and (ii) the one or more of the frequency shift peak values that are identified from the audio data that (I) corresponds to the sound generated by the second computing device and (II) was obtained in response to the first computing device transmitting data to the different, physically separate, second computing device indicating that the user of the first computing device was likely to have begun performing the movement using the first computing device.

11. The non-transitory computer-readable storage medium of claim 10, further comprising:
   executing a function corresponding to the particular gesture; and
   determining a direction associated with the particular gesture.

12. The non-transitory computer-readable storage medium of claim 10, wherein the sound generated by the second computing device is not audible to the user.

13. The non-transitory computer-readable storage medium of claim 10, wherein identifying, by the first computing device, the particular gesture corresponding to the movement based at least on (i) the accelerometer or gyroscope data that was used to determine that the user of the first computing device was likely to have begun performing the movement using the first computing device, and (ii) the one or more of the frequency shift peak values that are identified from the audio data that (I) corresponds to the sound generated by the second computing device and (II) was obtained in response to the first computing device transmitting data to the different, physically separate, second computing device indicating that the user of the first computing device was likely to have begun performing the movement using the first computing device comprises:
   receiving an indication of an expected audio signal, the expected audio signal having a particular frequency and one or more particular frequency peaks;
   comparing the obtained audio data with the indication of the expected audio signal to determine one or more peak offsets; and
   identifying the particular gesture corresponding to the movement based on the comparison of the obtained audio data with the indication of the expected audio signal and the determined one or more peak offsets.

14. The non-transitory computer-readable storage medium of claim 10, wherein obtaining, by the first computing device, audio data corresponding to the sound generated by the second computing device in response to the first computing device transmitting data to the different, physically separate, second computing device indicating that the user of the first computing device was likely to have begun performing the movement using the first computing device comprises receiving the audio data from a third computing device; and
   wherein the audio data corresponding to the sound generated by the second computing device includes a token.

15. The non-transitory computer-readable storage medium of claim 10, wherein identifying the one or more frequency shift peak values from the audio data comprises determining a velocity of the first computing device relative to the second computing device.

16. The non-transitory computer-readable storage medium of claim 10, wherein:
   the accelerometer or gyroscope data includes an angle associated with a yaw of the first computing device, an angle associated with a pitch of the first computing device, and an angle associated with a roll of the first computing device; and
   transmitting, from the first computing device to the different, physically separate, second computing device, the data indicating that the user of the first computing device is likely to have begun performing the movement using the first computing device comprises:
      transmitting, to the second computing device, data indicating a change in one or more of the yaw, the pitch, and the roll of the first computing device.

17. A system comprising:
   one or more processors and one or more computer storage media storing instructions that are operable, when executed by the one or more processors, to cause the one or more processors to perform operations comprising:
      determining, based on accelerometer or gyroscope data generated by one or more sensors on a first computing device, that a user of the first computing device is likely to have begun performing movement using the first computing device;
      after determining that the user of the first computing device is likely to have begun performing the movement using the first computing device and before the first computing device has identified a particular gesture corresponding to the movement, transmitting, to a different, physically separate, second computing device, data indicating that the user of the first computing device is likely to have begun performing the movement using the first computing device;
      before the first computing device has identified the particular gesture corresponding to the movement, obtaining, by the first computing device, audio data corresponding to a sound generated by the second computing device in response to the first computing device transmitting data to the different, physically separate, second computing device indicating that the user of the first computing device was likely to have begun performing the movement using the first computing device;
      before the first computing device has identified the particular gesture corresponding to the movement, identifying one or more frequency shift peak values from the audio data; and
      identifying, by the first computing device, the particular gesture corresponding to the movement based at least on (i) the accelerometer or gyroscope data that was used to determine that the user of the first computing device was likely to have begun performing the movement using the first computing device, and (ii) the one or more of the frequency shift peak values that are identified from the audio data that (I) corresponds to the sound generated by the second computing device and (II) was obtained in response to the first computing device transmitting data to the different, physically separate, second computing device indicating that the user of the first computing device was likely to have begun performing the movement using the first computing device.

18. The system of claim 17, further comprising:
   executing a function corresponding to the particular gesture; and
   determining a direction associated with the particular gesture.

19. The system of claim 17, wherein the sound generated by the second computing device is not audible to the user.

20. The system of claim 17, wherein identifying, by the first computing device, the particular gesture corresponding to the movement based at least on (i) the accelerometer or gyroscope data that was used to determine that the user of the first computing device was likely to have begun performing the movement using the first computing device, and (ii) the one or more of the frequency shift peak values that are identified from the audio data that (I) corresponds to the sound generated by the second computing device and (II) was obtained in response to the first computing device transmitting data to the different, physically separate, second computing device indicating that the user of the first computing device was likely to have begun performing the movement using the first computing device comprises:
- receiving an indication of an expected audio signal, the expected audio signal having a particular frequency and one or more particular frequency peaks;
- comparing the obtained audio data with the indication of the expected audio signal to determine one or more peak offsets; and
- identifying the particular gesture corresponding to the movement based on the comparison of the obtained audio data with the indication of the expected audio signal and the determined one or more peak offsets.

21. The system of claim 17, wherein obtaining, by the first computing device, audio data corresponding to the sound generated by the second computing device in response to the first computing device transmitting data to the different, physically separate, second computing device indicating that the user of the first computing device was likely to have begun performing the movement using the first computing device comprises receiving the audio data from a third computing device; and
- wherein the audio data corresponding to the sound generated by the second computing device includes a token.

22. The system of claim 17, wherein:
- identifying the one or more frequency shift peak values from the audio data comprises determining a velocity of the first computing device relative to the second computing device.

* * * * *